United States Patent [19]

Bartholomew et al.

[11] Patent Number: 4,742,678
[45] Date of Patent: May 10, 1988

[54] AIRCRAFT FIBER OPTIC CONTROL DEVICE

[75] Inventors: Richard D. Bartholomew, Huntsville, Ala.; Norman P. Huffnagle, Hopkins, Minn.

[73] Assignee: The Boeing Company, Seattle, Wash.

[21] Appl. No.: 590,151

[22] Filed: Mar. 16, 1984

[51] Int. Cl.[4] ............................................. F03G 7/06
[52] U.S. Cl. ............................ 60/516; 350/96.10; 60/531
[58] Field of Search ............... 350/96.10, 96.29; 60/530, 531, 516; 137/83; 251/11

[56] References Cited

U.S. PATENT DOCUMENTS

| 3,575,602 | 4/1971 | Townes et al. | 250/199 |
| 3,995,934 | 12/1976 | Nath | 350/96.10 |
| 4,305,640 | 12/1981 | Cullis et al. | 350/96.10 |
| 4,398,790 | 8/1983 | Righini et al. | 350/96.10 |

*Primary Examiner*—William L. Sikes
*Assistant Examiner*—Frank González

[57] ABSTRACT

An aircraft fiber optic control device adapted for connecting to a servovalve and the like. The device providing an optical-thermal-mechanical converter for driving a servovalve powered by the aircrafts hydraulic system.

6 Claims, 1 Drawing Sheet

AIRCRAFT FIBER OPTIC CONTROL DEVICE

BACKGROUND OF THE INVENTION

This invention relates to a fiber optic control device and more particularly, but not by way of limitation, to a fiber optic control device used in conjunction with aircraft controls and providing a converter for driving a hydraulic servo powered by the aircrafts hydraulic system.

Heretofore, aircraft controls were and still are susceptible to the effects of electomagnetic pulse and electromagnetic interference during the operation of electronic control subsystems. Attempts have been made to provide for adequate electromagnetic pulse and electromagnetic interference shielding. The shielding of the entire electric control system has been found to be unsatisfactory due to the large increase in weight.

Also electro-hydraulic generator techniques that generate mechanical power at the control actuator suffer from ineffective shielding and require some means of inner connection between the control subsystem and the cockpit position of the aircraft.

In the following U.S. patents various types of thermal electric control systems servo-motor assemblies and thermal actuators are described for controlling valve operation. They are U.S. Pat. No. 3,559,399 to Johnsen et al, U.S. Pat. No. 3,721,421 to Cliff, U.S. Pat. No. 4,114,645 to Pauliukonis and U.S. Pat. No. 4,249,794 to Haley. None of these prior art patents describe the unique features and combination of structure for solving the above-mentioned problems connected with controlling the effects of electromagnetic pulse and electromagnetic interference.

SUMMARY OF THE INVENTION

The subject aircraft fiber optic control device provides an electrically passive electromagnetic pulse and electromagnetic interference eliminator without massive shielding. Further, the device is physically small, highly reliable and has been found to be inherently failsafe during operation. By employing a balanced input optical to hydraulic converter for a fully hydraulic control system, the fiber optic control device has been found not to be susceptible to electromagnetic pulse and electromagnetic interference.

The device provides a balanced input minimizing temperature effects and provides an automatic return to a neutral position upon a basic system failure thereby reducing extreme failure effects.

The device provides a system redundancy which minimizes basic system failures. Also the use of fiber optics which has been hardened, the device withstands hostile environments such as a missile system, hydrofoil hull and fly-by fiber high speed attack aircraft.

In addition the small size and weight of the optic fibers makes it possible to run the fibers within the vehicles through and around existing structures.

The aircraft fiber optical control device includes a first and second optical fiber for receiving light energy. A first and second gas filled sealed bellow is connected to the fibers. The two bellows are disposed opposite each other and received a portion of the hydraulic supply line there between. When the first bellow receives light energy the gas therein is heated thereby expanding the bellow and mechanically moving the supply line in one direction. By heating the second bellow the gas therein expands the bellow causing the bellow to move the supply line in an opposite direction. When neither of the bellows are expanded the supply line rests in a neutral position.

The advantages and objects of the invention will become evident from the following detailed description of the drawings when read in connection with the accompanying drawings which illustrate preferred embodiments of the invention.

DETAILED DESCRIPTION OF THE DRAWINGS

Figure 1:
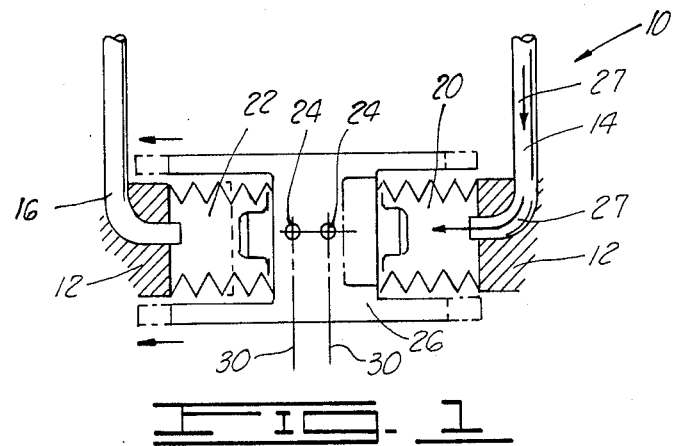
FIG. 1 illustrates a side view of the fiber optic control device.
Figure 3:
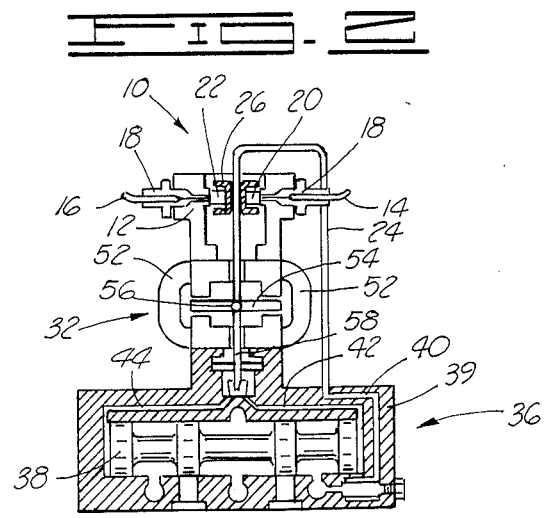
FIG. 3 illustrates the fiber optic control device connected to a standard mechanical force compensator and hydraulic servovalve.

In FIG. 1 and FIG. 3 the aircraft fiber optic control device is designated by general reference numeral 10. The device 10 includes a control device housing 12 for receiving one end of a first optical fiber 14 and a second optical fiber 16. The fibers 14 and 16 are connected to the housing 12 through the use of fiber connectors 18 shown in FIG. 3. The two optical fibers 14 and 16 conduct light energy such as infrared to two oppositely disposed gas filled sealed bellows 20 and 22. Disposed between the first bellow 20 and the second bellow 22 is a portion of a high pressure hydraulic supply line 24 surrounded by a thermal insulator 26.

In FIG. 1 the first optical fiber 14 is shown receiving light energy indicated by arrows 27 with the energy received inside the first bellow 20 where it heats a gas such as dry nitrogen or any other similar type of gas. As the gas is heated by the light energy the first bellow 20 expands moving the thermal insulator 26 and the supply line 24 from a neutral position indicated by line 28 to a position to the left indicated by line 30. It can be appreciated by transmitting light to the second optical fiber 16, in turn the gas in the second bellow 22 is heated returning the supply line 24 to its original neutral position and then to a right position which is not shown in the drawings.

Figure 2:
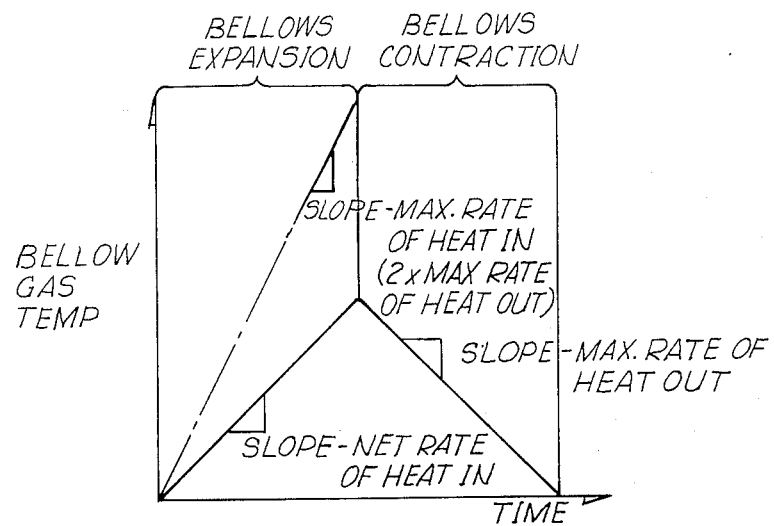
FIG. 2 illustrates the bellows input heat rate.

Referring now to FIG. 2 it has been found through the use of the thermal insulator 26 for insulating the bellows 20 and 22 the insulation 26 is sized such that the bellows gas can be cooled in a satisfactory level in less than one-half of the operating cycle of the device 10. Since the heat conduction path will be constant, it will be conducting heat out during the heating cycle. From reviewing FIG. 2 and comparing the bellow gas temperature along a vertical axis and time along a horizontal axis, the slope maximum rate of heat in is equal to two times the maximum rate of heat out when comparing the slope of the net rate of heat in and the slope of the maximum rate of heat out. Consequently, the energy input rate will have to be double the required net heat rate in order to allow for the simultaneous heat flow during the heating cycle. It has been found through sample calculations made using a 0.12 inch diameter by 0.10 inch long bellow and using a 30 hertz frequency response and with the use of a mechanical force compensator 32 as shown in FIG. 3 to reduce the force of a standard servovalve mechanical input to less than 0.25 lbs. at a plus or minus 0.003 displacement, the net energy into the bellows is in the range of 30 to 60 milliwatt range. A 200 to 400 micron diameter silicon core fiber can be used to transmit the required energy to the optical control device 10. Existing fiber to solid state laser emitter attaching technology can launch in excess of 300 watts peak power into the optical fibers 14 and 16.

In FIG. 3 a convention jet pipe servovalve is shown and designated by general reference numeral 36. It includes a spool valve 38 in a valve housing 39 with a return channel 40 and a right supply channel 42 and a left supply channel 44 for supplying fluid to the spool valve 38. Mounted on top of the valve housing 39 is the standard mechanical force compensator 32. The compensator 32 includes a pair of magnets 52 with a ferrite bar 54 disposed there between.

Heretofore the mechanical force compensator 32 would use conventional electrical coils mounted around the magnets 52 for energizing the compensator 32 and controlling the movement of the supply line 24 which rotates about a pivot 56. It can be appreciated that when the high pressure hydraulic supply line 24 moves about the pivot 56 and a lower end 58 of the line 24 moves to the right, fluid is then supplied through the right supply channel 42. In turn when the lower portion 58 moves to the left the left supply channel 44 is supplied with fluid for moving the spool valve 38 to the right. The fiber optic control device 10 eliminates the need of the conventional electrical coils which were used in conjunction with the mechanical force compensator 32.

In operation when light energy is received through the first optical fiber 14 the gas in the first bellow 20 is heated moving the supply line 24 to the left and pivoting the supply line 24 about pivot 56 moving the lower portion 58 of the line 24 to the right thereby supplying fluid to the right supply channel 42. In FIG. 3 the lower portion 58 of the supply line 24 is shown in a neutral position. Likewise, by supplying light energy to the second optical fiber 16 the second bellow 22 moves the supply line 24 to the right pivoting the supply line about pivot 56 and moving the lower portion 58 of the supply line 24 to the left and supplying hydraulic fluid to the left supply channel 44.

Convention servo valves such as the servo valve 36 as shown have several adjustable force compensating features that compensate for mechanical spring force such as jet pipe supply line force, spring forces in the bellows 22 and 20 and the spring force of the captive gas in the bellows. These force compensators all act together as a positive feedback in the overall servo control equations that can reduce the force requird out of the bellows to near zero. Therefore, net operating forces of 0.01 to 0.025 lbs. are now achieveable using the subject fiber optic control device 10 in conjunction with the standard mechanical force compensator 32 in the control of the servovalve 36.

Changes may be made in the construction and arrangement of the parts or elements of the embodiments as described herein without departing from the spirit or scope of the invention defined in the following claims.

What is claimed is:

1. An aircraft fiber optic control device adapted for engaging and moving a high pressure hydraulic supply line in opposite directions, the movement by the device allowing the line to pivot about a pivot point and redirect fluid to opposite supply channels in a servovalve, the device comprising:

a first light means for receiving light energy;

a first gas filled container means for expansion and contraction when the gas is heated therein, the first light means connected thereto;

a second light means for receiving light energy; and a second sealed gas filled container means for expansion and contraction when the gas is heated therein, the second light means connected thereto, the second container means disposed opposite the first container means with a portion of the supply line received there between, the first container means moving the supply line in one direction when the gas is heated therein by the first light means, the second container means moving the supply line in the opposite direction when the gas is heated therein by the second light means.

2. The device as described in claim 1 wherein the first and second light means are a first and second optical light fiber.

3. The device is described in claim 1 wherein the first gas filled container means and the second gas filled container means are a first and second gas filled bellow.

4. The device as described in claim 3 further including a thermal insulator disposed around the first and second bellows and a portion of the supply line for cooling the bellows when the bellows are contracted.

5. An aircraft fiber optic control device adapted for engaging and moving a high pressure hydraulic supply line in opposite direction, the movement by the device allowing the line to pivot about a pivot point and redirect fluid to opposite supply channels in a servovalve, the device comprising:

a first optical fiber for receiving light energy;

a first gas filled sealed bellow, the first optical fiber connected at one end to the bellow;

a second optical fiber for receiving light energy; and a second gas filled sealed bellow, the second optical fiber connected at one end to the bellow, the second bellow disposed opposite the first bellow with a portion of the supply line received there between the first bellow moving the supply line in one direction when the gas therein is heated by light received by the first optical fiber, the second bellow moving the supply line in the opposite direction when the gas therein is heated by light received by the second optical fiber.

6. The device as described in claim 5 further including a thermal insulation received around a portion of the supply line and around the first and second bellows for cooling the bellows when they are contracted.

* * * * *